No. 844,008. PATENTED FEB. 12, 1907.
G. T. FERGUSON.
OIL PUMP.
APPLICATION FILED SEPT. 11, 1905.

WITNESSES:
C. M. Burman.
J. H. Carroll.

INVENTOR
Guy T. Ferguson
BY
Harry Lea Dodson
ATTORNEY

UNITED STATES PATENT OFFICE.

GUY T. FERGUSON, OF MINOOKA, ILLINOIS.

OIL-PUMP.

No. 844,008.  Specification of Letters Patent.  Patented Feb. 12, 1907.

Application filed September 11, 1905. Serial No. 277,808.

*To all whom it may concern:*

Be it known that I, GUY T. FERGUSON, residing at Minooka, in the county of Grundy and State of Illinois, have invented a certain new and useful Improvement in Oil-Pumps, of which the following is a specification.

My invention relates to that class of oil-pumps which are employed for lubricating purposes, and has for its object to simplify the construction of said pumps and to provide for a positive feed of a certain quantity, and has for its further object to so construct the valve that it will automatically take up the wear, and consequently not get out of order.

My method of attaining the foregoing may be more readily understood by having reference to the accompanying drawings, which are a part of this specification and are hereunto annexed, in which—

Figure 1 is an elevation of my improved pump. Fig. 2 is a detail view of the clutch. Figs. 3, 4, 5, 6, and 7 are sectional views showing the valve at different points of the stroke. Fig. 8 is a view showing the split in the valve.

Similar figures refer to similar parts throughout the entire description.

In the drawings, 1 is the oil-cylinder, which has cast or formed thereon lugs 2 and 3. This cylinder has a cap or cover of the usual construction hinged upon its top. The lug 2 serves as the base on which to mount the valve-chamber 4, and the lug 3 serves as a base for the bearings 5 for the drive-shaft 6. This shaft has mounted thereon midway between the bearings 5 an eccentric 7, which is attached to the shaft by any of the usual methods, and has a strap 8 of the usual construction surrounding the same. Motion is imparted to this shaft by means of a friction-disk 9, which has mounted therein a clutch 10, motion being imparted to the clutch by means of the arm or rod 11, which has cast or formed integral therewith a wedge 12, which engages an inclined plane 13 on the friction-clutch, a set-screw being located in the clutch to provide for a take-up of the wear. The arm 11 may be driven by any suitable power. (Not shown.) As it moves forward the wedge 12 is brought in contact with the face of the inclined plane 13, and this increases the tension existing between the friction-disk 9 and the clutch 10, so that the friction-disk is rotated for a short distance. On the return movement the friction-disk remains stationary, while the clutch, being released by the backward movement of the arm 11 and the wedge 12, is moved backward ready to take up the motion on the forward stroke. The eccentric-strap is connected to a piston 14 by means of a pin or pivot 16 in the usual manner, a stuffing-box 17 being provided to prevent the leakage of the oil.

An eduction-port 18 is provided leading from the oil-cylinder 1 to the interior of the valves-chamber 4. The piston 14 has a reduced end 19, upon which is mounted the valve 20. This valve is constructed with two slots 21 and is slidable upon the reduced end 19 of the piston, the valve being prevented from rotating upon said end by a pin 22. This valve is split at one side, as shown in Fig. 8, and this produces a similar action to a piston-ring, the expansion of the metal compensating for the wear, so that it remains tight at all times. A port or passage 23 is provided for the egress of the oil.

Fig. 3 shows the piston clear down and illustrates the slots 21 and pin 22, which secure the valve to the piston.

Fig. 4 shows the piston raised and in a position to permit the oil to flow from the oil-chamber through the port or passage 18 into the valve-chamber, where it passes through a port or passage 24, which is located in the valve, to register with the port or passage 18 when the valve is in the position shown in this figure, a groove 25 being cut in the reduced end 19 of the piston to provide for the passage of the oil from the port 24 to the lower part of the valve-chamber.

Fig. 5 shows the piston at the next stage in the upward stroke where the port or passage 18 is cut off and the port or passage 23 is opened to permit the oil to flow out to the desired working part, which it does through a port or passage 26, which is located in the valve, so as to register with the port or passage 23 when the valve is in the position shown in this figure, a corresponding groove 27 being cut in this side of the reduced stem 19 of the piston to permit the egress of the oil.

Figure 1:
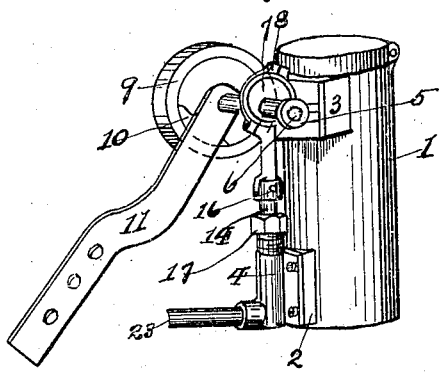
Figure 2:
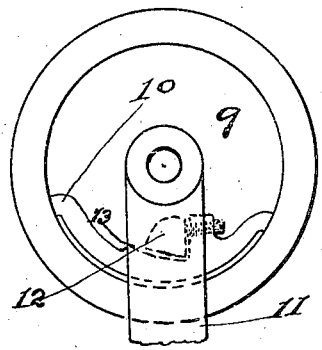
Figure 3:
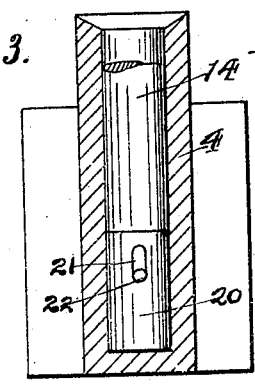
Figure 4:
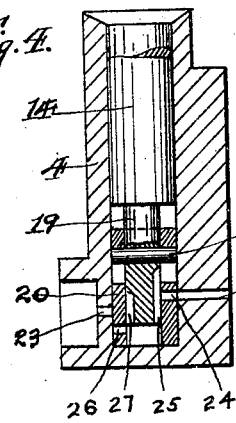
Figure 5:
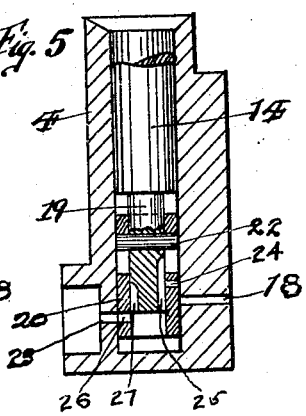
Figures 6, 8:
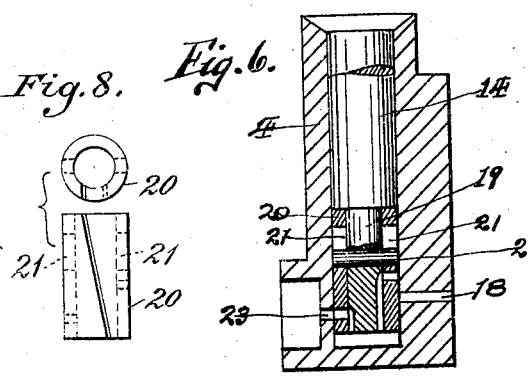
Fig. 6 shows the piston on the downward stroke, the valve remaining stationary, the reduced end of the piston sliding within the valve and forcibly ejecting the oil out through the port or passage 23.
Figure 7:
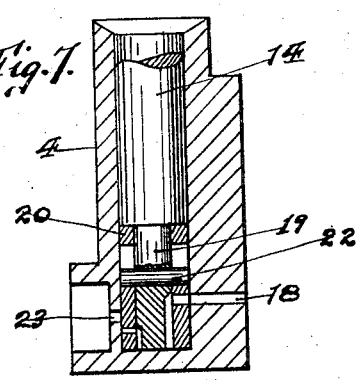
Fig. 7 shows the piston clear down, all of the oil having been ejected and the port or passage 18 uncovered, so as to be in readiness to receive a new supply on the upward stroke.

It will be apparent from a careful inspection of the drawings that in this construction not only is all of the wear taken up by the expansion of the metal of which the valve is constructed, but there are no springs or other parts which are liable to get out of order and the pump acts as an absolutely positive feed in insuring the delivery of the required amount of oil at each stroke.

Having described my invention, what I regard as new, and desire to secure by Letters Patent, is—

1. In a device of the character described, the combination with an oil-chamber, of a cylindrical valve-chamber mounted upon said oil-chamber, there being a port or passage leading from said oil-chamber to the interior of the valve-chamber, and an eduction-port leading from the interior of said valve-chamber, a piston operating in said valve-chamber, a cylindrical valve mounted upon the end of said piston, said valve having passages therein which lead respectively from the induction-port to the interior of the valve and from the interior of the valve to the eduction-port, said valve being split to permit the expansion of the metal to take up the wear, and means to impart a reciprocating motion to said piston, for the purpose set forth substantially as described.

2. In a device of the character described, the combination with an oil-chamber, of a cylindrical valve-chamber mounted upon said oil-chamber, there being a port or passage leading from the interior of the oil-chamber to the interior of the valve-chamber, and an eduction-port leading from the interior of said valve-chamber, a piston operating in said valve-chamber, a cylindrical valve mounted upon the end of said piston, a pin securing the said valve to the end of the piston, said valve having slots in the side thereof, fitting to and coinciding with said pin to prevent the rotation of the valve and to permit it to slide upon the end of the piston, said valve having passages therein which lead respectively from the induction-port to the interior of the valve and from the interior of the valve to the eduction-port, said valve being split to permit the expansion of the metal to take up the wear, and means to impart a reciprocating motion to said piston, for the purpose set forth substantially as described.

3. In a device of the character described, the combination with an oil-chamber of a cylindrical valve-chamber mounted upon said oil-chamber, there being an induction port or passage leading from said oil-chamber to the interior of the valve-chamber and an eduction port or passage leading from the interior of the valve-chamber, a piston operating in said valve-chamber, said piston being provided with means to prevent the leakage of oil, the end of said piston being reduced and having a shoulder thereon, a tubular valve mounted upon the said reduced end, the periphery of which corresponds in diameter to the diameter of the piston, said valve being slidable upon the said reduced end, and a pin to prevent the rotation of the said valve and securing it to the end of the piston, said valve having slots in the sides thereof, fitting to and coinciding with said pin to permit it to slide upon the reduced end of the piston, said valve having passages therein which lead respectively from the induction-port to the interior of the valve and from the interior of the valve to the eduction-port, said valve being split to permit the expansion of the tubing to take up the wear, and means to impart a reciprocating motion to said valve and piston, for the purpose set forth substantially as described.

GUY T. FERGUSON.

Witnesses:
S. A. FERGUSON,
WILLIAM A. FERGUSON.